United States Patent
Tan

(10) Patent No.: US 8,699,555 B2
(45) Date of Patent: Apr. 15, 2014

(54) ADAPTIVE EQUALIZER

(75) Inventor: Mehmet Ali Tan, Irvine, CA (US)

(73) Assignee: Maxim Integrated Products, Inc., San Jose, CA (US)

( * ) Notice: Subject to any disclaimer, the term of this patent is extended or adjusted under 35 U.S.C. 154(b) by 51 days.

(21) Appl. No.: 13/309,836

(22) Filed: Dec. 2, 2011

(65) Prior Publication Data

US 2013/0142244 A1  Jun. 6, 2013

(51) Int. Cl.
*H03K 5/24* (2006.01)
*H03K 5/22* (2006.01)
*H04L 25/03* (2006.01)
*H04B 3/14* (2006.01)

(52) U.S. Cl.
USPC .......... 375/232; 375/229; 375/230; 333/28 R; 333/24 R

(58) Field of Classification Search
USPC ................. 375/232, 229, 350, 346, 316, 230; 333/28 R, 24 R
See application file for complete search history.

(56) References Cited

U.S. PATENT DOCUMENTS

| | | | | |
|---|---|---|---|---|
| 5,214,391 A | * | 5/1993 | Serizawa et al. | 329/316 |
| 5,371,803 A | * | 12/1994 | Williamson, III | 381/104 |
| 6,246,268 B1 | * | 6/2001 | Cheng | 327/65 |
| 8,390,740 B2 | * | 3/2013 | Ritter et al. | 348/607 |
| 2012/0026401 A1 | * | 2/2012 | Hoerl | 348/575 |

\* cited by examiner

*Primary Examiner* — Chieh M Fan
*Assistant Examiner* — Michelle M Koeth
(74) *Attorney, Agent, or Firm* — TIPS Group

(57) ABSTRACT

An adaptive equalizer circuit, set forth by way of example and not limitation, includes a plurality of paths receiving an input signal. One or more equalizers are each provided on one of the paths and are operative to equalize signal amplitude. An equalizer selector receives the input signal and is operative to output a selection signal based on higher-frequency content and lower-frequency content of the input signal. The selection signal is operative to select one of the paths to output an output signal that is based on the input signal.

6 Claims, 7 Drawing Sheets

| C( ) | 4 | 3 | 2 | 1 |
|---|---|---|---|---|
| E(0) | 0 | 0 | 0 | 0 |
| E(1) | 0 | 0 | 0 | 1 |
| E(2) | 0 | 0 | 1 | 1 |
| E(3) | 0 | 1 | 1 | 1 |
| E(4) | 1 | 1 | 1 | 1 |

ADAPTIVE EQUALIZER

BACKGROUND

There are many electronic applications for which data needs to be transmitted at high speeds over band-limited channels. For example, data storage systems, servers, data communication systems, and digital video systems all need to provide high-speed serial links over band-limited channels. This can be accomplished by providing a transmitter at one end and a receiver at the other end of a "telecommunications channel" or "communication link."

In telecommunications, inter-symbol interference (ISI) is a form of signal distortion wherein a transmitted symbol interferes with subsequent transmitted symbols. This is an unwanted phenomenon as the previous symbols have similar effect as noise, thus making the communication channel less reliable. That is, the presence of ISI may introduce errors at the receiver output. Therefore, in the design of telecommunication systems, an objective is to minimize the effects of ISI and thereby deliver the digital data to its destination with the lowest error rate possible, e.g., with the best signal-to-noise ratio (SNR).

Some ways to fight inter-symbol interference include, for example, adaptive equalization techniques. Adaptive equalization can be used to adapt to changing conditions of an incoming signal to provide more effective reduction of ISI. For example, one type of analog adaptive equalization technique uses Continuous Time Linear Equalizers (CTLEs), such as the MAX3800 series of products from Maxim Integrated Products of Sunnyvale, Calif. CTLEs can be used in communication links to compensate for the channel's frequency dependent loss which causes ISI.

While such equalizers operate adequately for their intended applications, they also exhibit certain drawbacks under some circumstances. For example, such equalizers may use complex blocks, creating increased cost and power consumption. These devices also typically use feedback to provide adaptive equalization, which can introduce stability issues and slow down the response of the equalization. Furthermore, these types of devices may have issues with long single-frequency signals, such as D10.2 signals in 8b/10b encoding. These types of devices also may attenuate the input signal after amplification, causing potential dynamic range issues.

These and other limitations of the prior art will become apparent to those of skill in the art upon a reading of the following descriptions and a study of the several figures of the drawing.

SUMMARY

An adaptive equalizer circuit, set forth by way of example and not limitation, includes a plurality of paths receiving an input signal. One or more equalizers are each provided on one of the paths and are operative to equalize signal amplitude. An equalizer selector receives the input signal and is operative to output a selection signal based on higher-frequency content and lower-frequency content of the input signal. The selection signal is operative to select one of the paths to output an output signal that is based on the input signal.

In some embodiments, one of the paths is a through path not including equalization of the input signal. A path having one of the equalizers is selected in response to the higher-frequency content being attenuated relative to the lower-frequency content, and the through path is selected in response to the higher-frequency content not being attenuated relative to the lower-frequency content.

A method for providing adaptive equalization for a signal, set forth by way of example and not limitation, includes receiving an input signal at a plurality of paths and at an equalizer selector, the input signal including higher-frequency content and lower-frequency content. At least one of the paths includes an associated equalizer. One of the paths is selected using the equalizer selector based on the higher-frequency content and lower-frequency content in the input signal. An output signal is provided from the selected path based on the input signal.

These and other combinations and advantages and other features disclosed herein will become apparent to those of skill in the art upon a reading of the following descriptions and a study of the several figures of the drawing.

BRIEF DESCRIPTION OF THE DRAWINGS

Several examples will now be described with reference to the drawings, wherein like components are provided with like reference numerals. The examples are intended for the purpose of illustration and not limitation. The drawings include the following figures.

DETAILED DESCRIPTION OF EXAMPLE EMBODIMENTS

In the following descriptions, components will be discussed with reference to specific examples such as particular frequency ranges, particular communication standards, etc. These examples are not to be seen as limiting but, rather, illustrative of the general concepts set forth herein.

Figure 1:
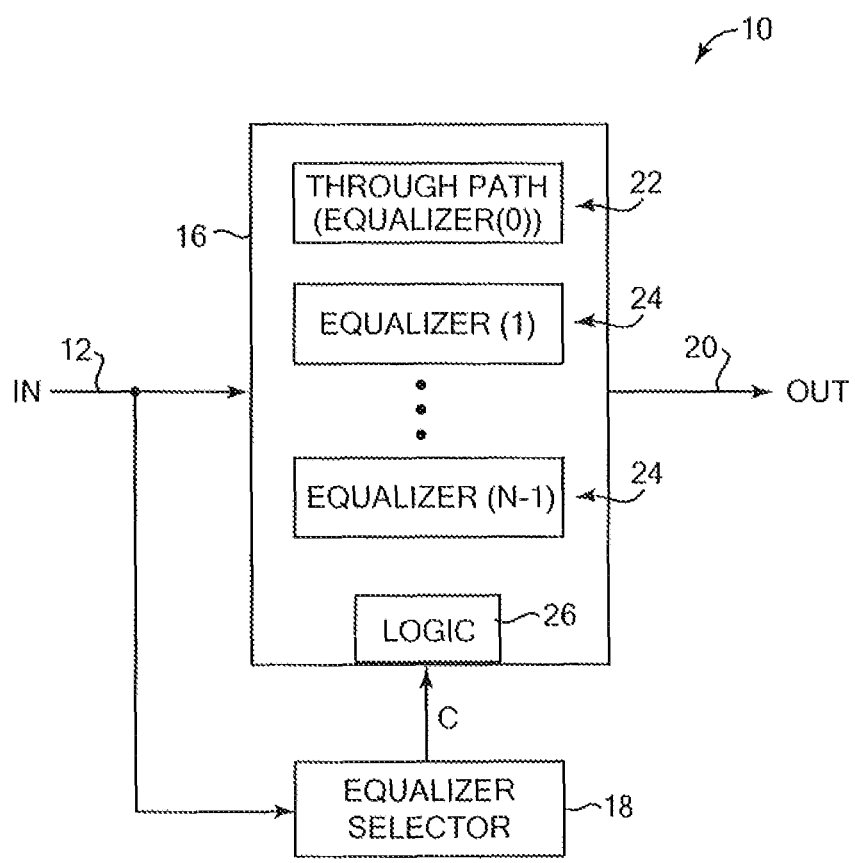
FIG. 1 is a block diagram of an example adaptive equalizer system suitable for use with one or more features or embodiments described herein.

FIG. 1 is a block diagram of an example adaptive equalizer system 10 suitable for use with one or more features and embodiments described herein. The equalizer system 10 can in some embodiments be included on an integrated circuit chip in an electronic device, which can be implemented in any of various forms, such as an IC chip, an application-specific integrated circuit (ASIC), field programmable gate array (FPGA), or other processors or circuits. Portions of the system 10 can also be implemented using logic gates and/or one or more state machines.

Adaptive equalizer system 10 can be included in any of a wide variety of communication systems. In general, the adaptive equalizer system 10 is coupled to a physical or wireless communication link in a communication system, and receives data from one or more transmitters of the communication system that are connected to the communication link. The equalizer system 10 can included in any suitable electronic device. For example, the adaptive equalizer system 10 can be included in a repeater device, computer device, portable electronic device, data storage device, or other device. The electronic device can take the form of a server, desktop computer, storage device, laptop computer, portable device, cell phone, tablet, personal digital assistant (PDA), e-book reader, peripheral device, video game console, set top box, appliance, or various other forms of electronic devices.

For example, the equalizer system 10 can be provided in a repeater that is coupled between a transmitter and a receiver to re-transmit signals received from the transmitter at a higher amplitude and/or power to the receiver, such as a serial link data repeater. In one example, the repeater can be provided in an electronic device and receive a transmission over a communication link. The repeater performs adaptive equalization to the input signal as appropriate and provides an equalized output signal to other components in the electronic device. The repeater can also be a system physically separated from transmitter and receiver and connected via the communication link.

The adaptive equalizer system 10 receives data on an input signal line 12, which is connected to the communication link receiving data from one or more transmitters. In some embodiments, the input line 12 can be connected to a standardized communication interface that communicates data over the communication link between electronic devices using a standardized protocol. In some examples, a standard communication interface such as Universal Serial Bus (USB) can be used. For example, some embodiments herein can be used with the USB 3.0 standard providing higher-speed communication, or any of the applicable USB versions or standards can be used with features described herein. Embodiments can be used with other communication standards for the communication link, such as Serial Advanced Technology Attachment (SATA), eSATA (external SATA), PCIE (Peripheral Component Interconnect Express), Firewire, inter-chip interfaces, etc.

Adaptive equalizer system 10 includes an equalizer block 16 and an equalizer selector 18. The equalizer block 16 receives the input signal 12 and outputs an output signal 20 that is based on the input signal 12. The equalizer block 16 includes multiple paths ("N" paths) for the input signal, where one of the paths provides the basis for the output signal 20. Each path in block 16 is either a through path 22 (also labelled as "equalizer(0)") or an equalizer path including an equalizer 24. One or more equalizers 24 can be included in the block 16.

The through path 22 provides a path for the input signal 12 without any substantial equalization or filtering, such that the input signal is passed through the equalizer block 16. In some embodiments, the through path 22 can provide some gain to the input signal. In one example embodiment, a differential pair of transistors can be used on the through path 22, similar to the low-pass filter circuit described below with respect to FIG. 8 but without the capacitors in that circuit used for filtering.

One or more equalizers 24 are included in block 16. Each equalizer 24 is provided on a different path in block 16 and equalizes signal amplitude in an input signal 12 if appropriate. Each equalizer 24 can provide a gain to higher-frequency content of the input signal 12. In one example, an equalizer 24, Equalizer(1), can provide a first gain to the higher-frequency content of the input signal 12, and a second equalizer 24, Equalizer(2), can provide a second gain to the input signal 12. The second gain can be higher than the first gain. In some embodiments, each equalizer 24 provides its gain in a different range of higher frequencies. The ranges of frequencies tuned for each equalizer 24 can overlap in some embodiments.

Higher-frequency content in a signal typically becomes more attenuated than lower-frequency content, resulting in a large deterministic jitter caused by inter-symbol interference (ISI). For example, longer channel lengths typically cause greater deterministic jitter than shorter channel lengths, such as occurs when connecting a longer cable to a device. Each equalizer 24 can equalize input signal amplitude by boosting the amplitude of the higher-frequency content to be close to the amplitude of the lower-frequency content. In this way, each equalizer 24 can, for example, reduce or compensate for a reduction of channel bandwidth and deterministic jitter effects caused by inter-symbol interference (ISI) in a particular input signal 12.

Each equalizer 24 is associated with a different gain, and in some embodiments, one or more of these gains can be associated with common channel lengths which may be connected to the equalizer system 10. For example, some communication interface standards such as Universal Serial Bus (USB) allow a user to connect cables of different lengths to a device. Each longer cable length may cause more deterministic jitter and may cause an equalizer 24 providing a higher gain at higher frequencies to be selected for output. In one example, a first length range of cable may be handled adequately by Equalizer(1), a second, longer length range by Equalizer(2), and a third, longest length range by Equalizer (3), each range approximately equal. In other embodiments, different numbers of ranges and equalizers can be used.

The equalizers 24 can be implemented in any suitable manner. For example, each equalizer 24 can be a linear equalizer having different component values than the other equalizers 24 to provide filter coefficients for the particular gain and frequency range intended to be used with that equalizer. In some embodiments, an equalizer 24 can be implemented including a filter circuit similar to the filter circuit described below with reference to FIG. 9 for a detector of the equalizer selector 18. Each equalizer 24 can, for example, have resistors and capacitors with values suited to the particular gain and range of higher-frequency content associated with that equalizer. In some example embodiments, the equalizers 24 can be connected together as different stages in a single circuit, where each stage receives the input signal and processes it in parallel, or only one selected stage receiving enough current to be active.

Logic 26 can be used to convert the control signal C received from the equalizer selector 18 into a form of signal(s) appropriate for selecting one of the paths of the equalizer block 16 for output. For example, the logic 26 can include a decoder operative to convert a signal C in bit-code form into selection signals. In some embodiments, the logic 26 can be included in the equalizer block 16 and can perform other functions for the block 16, while in other embodiments the logic 26 can be included in one or more components, e.g., in a distributed form.

Equalizer selector 18 also receives the input signal 12 and, based on the frequency content in the input signal, determines which path in the equalizer block 16 should be selected for output. Once the determination is made, the equalizer selector 18 can provide a selection signal or control signal C to the equalizer block 16 to indicate the path selection to the equalizer block 16. Equalizer selector 18 thus provides adaptive equalization since any of the equalizers 24 can be selected based on the received input signal content. Since each equalizer 24 can be best suited for boosting a particular amount of amplitude for a particular range of higher frequencies and not for frequencies outside that range, the selection of a path (such as through path 22 or one of the equalizers 24) appropriate to the currently-received input signal 12 is needed to equalize the signal amplitude and reduce deterministic jitter in the signal most effectively. The determination of which path to select is described in greater detail below with respect to FIGS. 4 and 5. In some embodiments, the control signal C received by the equalizer block 16 has been processed by logic, processor, or other circuitry, as described in greater detail below with respect to FIGS. 4 and 5.

Figure 2:
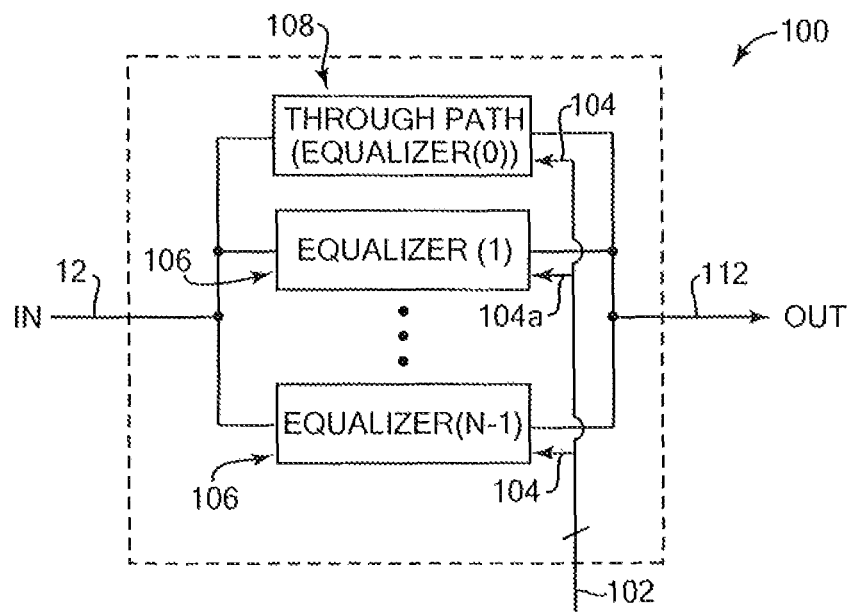
FIG. 2 is a block diagram illustrating one example embodiment of the equalizer block of FIG. 1.

FIG. 2 is a block diagram illustrating one example embodiment 100 of the equalizer block 16 of the adaptive equalizer system 10 of FIG. 1. In equalizer block 100, control signals 102 are received from the logic 26 (or directly from the equalizer selector 18). The control signals 102 can include multiple control lines 104, where each control line is input to one of the equalizers 106 and the through path 108. The control lines 104 can provide an enable signal to selectively turn off or on each of the equalizers 106 and through path 108. For example, if the equalizer selector 18 has determined that the first equalizer, Equalizer(1), should be used, then the control signal 104a is set to enable or activate Equalizer(1) while the other control signals 104 are set to disable or deactivate the through path 108 and the other equalizers 106 and their paths. The path of the enabled equalizer 106 receives the input signal 12, equalizes the input signal using the enabled equalizer 106, and outputs an equalized output signal on output 112. The disabled equalizers do not output a signal on output 112. Equalizers 106 and through path 108 can be enabled or disabled using a variety of implementations in different embodiments, such as increasing or reducing current on differential amplifiers to enable or disable, opening and closing switches, etc.

Figure 3:
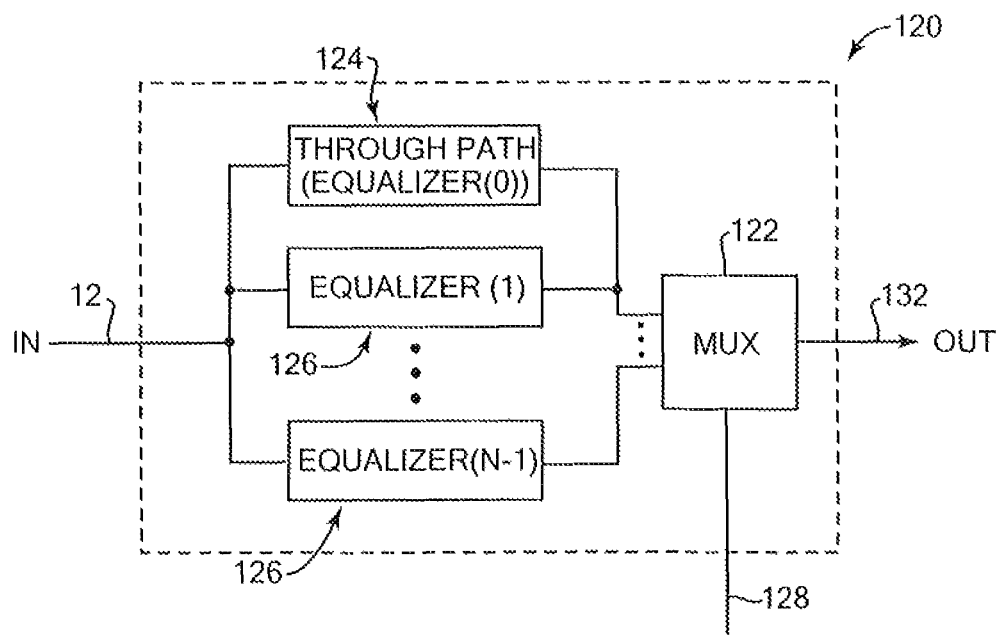
FIG. 3 is a block diagram illustrating another example embodiment of the equalizer block of FIG. 1.

FIG. 3 is a block diagram illustrating another example embodiment 120 of the equalizer block 16 of the adaptive equalizer system 10 of FIG. 1. In equalizer block 120, a multiplexer 122 is coupled to the outputs of through path 124 and the equalizers 126. The control signal 128 is received by the multiplexer 122 from the logic 26 (or directly from the equalizer selector 18) to select which one of the multiplexer's inputs are to be output by the multiplexer. In some embodiments, each through path 124 and equalizer 126 can be processing the input signal 12 in parallel and providing its output to the multiplexer 122. Based on the control signal 128, the multiplexer 122 outputs one of its inputs from the through path 124 and the equalizers 126 as the output signal on the output 132. In other embodiments, a multiplexer can be positioned before the equalizers and through path to select one of the paths for receiving the input signal 12 and for providing output.

Figure 4:
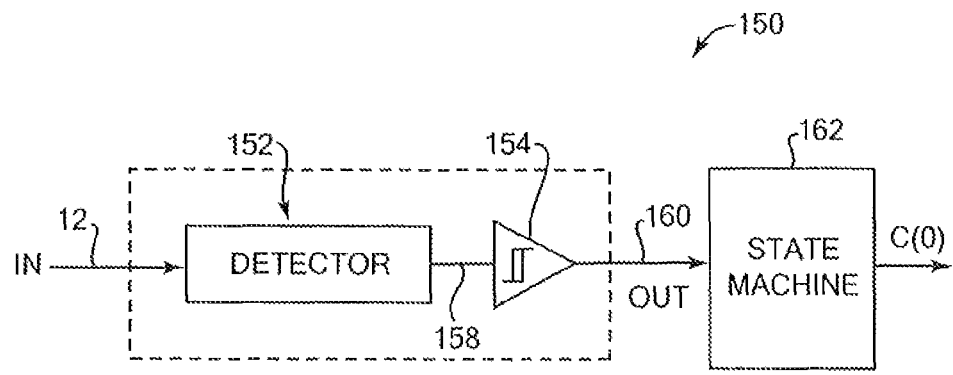
FIG. 4 is a block diagram of one example embodiment of the equalizer selector of FIG. 1.

FIG. 4 is a block diagram of one example embodiment 150 of the equalizer selector 18 of FIG. 1. In this example, there are two selectable paths in the equalizer block 16: a through path and one equalizer path. The equalizer selector 150 includes a detector 152 and a Schmitt trigger 154.

Detector 152 receives the input signal 12 and, based on the higher-frequency content and the lower-frequency content in the input signal, outputs a decision signal 158. Signal 158 indicates whether to select the through path 22 or the path of the equalizer 24 for output from the equalizer block 16. Detector 152 thus examines whether the higher-frequency content of the input signal 12 is substantially attenuated relative to the lower-frequency content in the signal. The ratio of higher-frequency amplitude to lower-frequency amplitude as desired in the originally transmitted signal should be preserved.

In this example, since there is only one detector 152, a frequency range higher than a lowest frequency range is examined by the detector 152, which is any frequency higher than a predetermined cutoff or threshold frequency. If the detector 152 determines that the amplitude of the higher-frequency content is sufficiently attenuated, then the detector outputs decision signal 158 indicating that the input signal 12 should be processed output via the path of equalizer 24. If, on the other hand, the detector 152 determines that the input signal 12 has sufficiently-high amplitude in the examined frequency range(s), then the detector 152 outputs decision signal 158 indicating that the input signal 12 should be sent to and output by the through path 24 from block 16. Thus the decision signal 158 determines the selection of the path in the equalizer block 16.

Schmitt trigger 154 receives the decision signal 158 and provides a smoothed output that does not oscillate or change frequently. For example, the output from the detector 152 may be fast-changing due to a varying amplitude or power level in the input signal 12. Schmitt trigger 154 can provide an output signal 160 that retains its value (as received from detector 152) until the value changes for a sufficient time to trigger a change in the output of the Schmitt trigger 154, based on hysteresis.

Output signal 160 can be provided to the equalizer block 16 in some embodiments. In other embodiments, the output signal 160 can be processed further before sending the control signal to the block 16. In one example, in the embodiment of FIG. 4, a state machine 162 can receive the output of the Schmitt trigger 154. The state machine can, for example, be provided separately from the equalizer selector 18 or be included in the selector. The state machine 162 can choose a sampling time window, end the detection after a predetermined or conditional time period, and/or make sure that the output signal meets predetermined criteria. The state machine 162 can send a processed signal as control signal C to the equalizer block 16. One example of a method implemented by a state machine such as state machine 162 is described in greater detail below with respect to FIG. 11.

Figure 5:
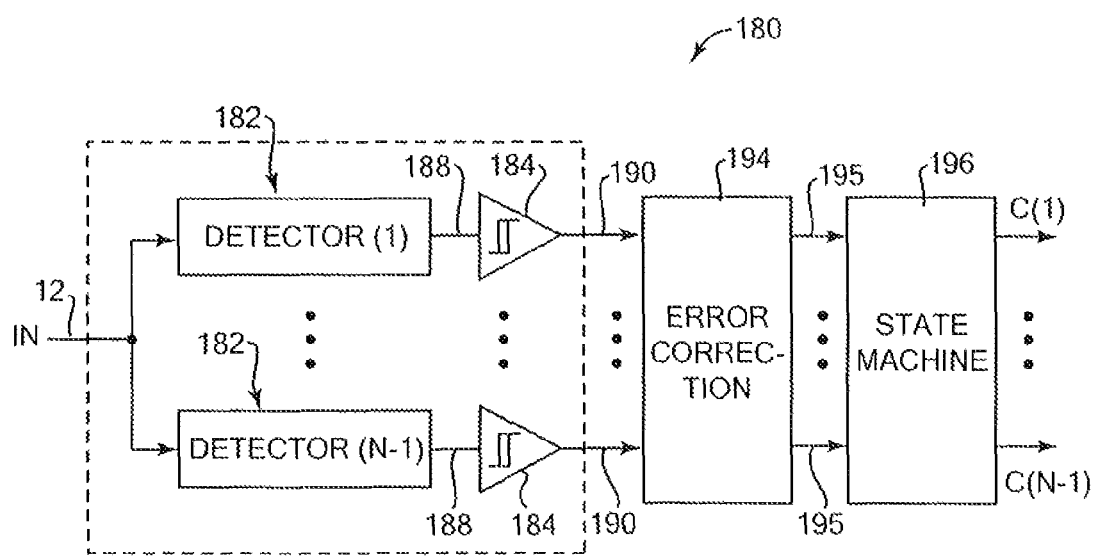
FIG. 5 is a block diagram of another example embodiment of the equalizer selector of FIG. 1.

FIG. 5 is a block diagram of another example 180 of the equalizer selector 18 of FIG. 1. In this example, the number of selectable paths in the equalizer block 16 is greater than two, including the through path and multiple equalizer paths. The equalizer selector 180 includes an array of detectors 182 and Schmitt triggers 184.

In one example embodiment as shown in FIG. 5, the number of detectors 182 can be the same as the number of equalizers 24 being used in the equalizer block 16. All of the detectors 182 receive the input signal 12 and, based on higher-frequency content and lower-frequency content in the input signal, at least one of the detectors 182 outputs a decision signal 188. Each detector 182 compares the signal amplitude in a higher-frequency range with the amplitude in a lower-frequency range, while providing a different gain to the examined higher-frequency range. This allows each detector 182 to determine if the higher-frequency content needs the particular gain provided by that detector 182.

In addition, each detector 182 can examine amplitude in a different higher-frequency range. A reduction in bandwidth of the input signal 12 increases the deterministic jitter caused by ISI. For example, this may occur if the length of input transmission channel increases. This causes the higher-frequency content to be reduced and be centered around different frequencies. Therefore, each detector 182 in the array of detectors can be tuned to a different higher-frequency range, e.g., have a cutoff frequency at a different high frequency. The particular gain and frequency range used for each detector 182 depends on signals, channel, and circuit in a particular implementation. In some embodiments, each successive detector 182 can examine a higher frequency range than the previous detector 182 and provide a higher gain to the higher-frequency range than the previous detector 182.

In one non-limiting example, Detector(1) can provide a higher-frequency gain of 0 dB for a higher-frequency range having a cutoff frequency at 600 MHz, Detector(2) can provide a gain of 3.5 dB for a higher-frequency range having a cutoff frequency at 1 GHz, Detector(3) can provide a gain of 6 dB for a higher-frequency range having a cutoff frequency at 2 GHz, and Detector(4) can provide a gain of 10 dB for a higher-frequency range having a cutoff frequency at 3 GHz. Other gains and frequencies can be used in other embodiments. In some embodiments, each detector 182 can provide approximately the same gain for approximately the same higher-frequency band as provided by one of the equalizers 24 in the equalizer block 16. For example, Detector(1) can examine the input signal using about the same gain for the same higher-frequency band as provided by Equalizer(1). Other embodiments can use different numbers of detectors 182 compared with equalizers 24.

If a detector 182 determines that the input signal 12 has an attenuated amplitude or power in the higher-frequency range examined by that detector 182 relative to a lower-frequency range, then the detector outputs a decision signal 188 indicating this attenuation. If, on the other hand, a detector 182 determines that the input signal 12 has sufficient power in the examined higher-frequency range, then that detector 182 outputs a decision signal 188 indicating a lack of attenuation. Some embodiments can provide all detectors 182 processing the input signal simultaneously, or in other embodiments only a subset of detectors 182 (or one detector) can be active at any one time. One example embodiment of a detector 182 is described in greater detail below with respect to FIG. 7.

A Schmitt trigger 184 is coupled to the output of each detector 182 and each trigger 184 receives the decision signal 188 from its associated detector 182. Each Schmitt trigger 184 provides a smoothed output, similarly as described above for FIG. 4.

Output signals 190 can be provided to the equalizer block 16 in some embodiments as control signals C(1) through C(N-1), each C signal from an associated detector 182. In some embodiments, each detector decision signal 188 can indicate whether equalization is needed by the amount of gain in the frequency band used by the associated detector 182, which adds to a weighted result when collecting all the outputs of the detectors 188. In one example, each signal C can be included as a bit in a code, the code indicating the weights contributed by the detectors 182 and indicating which path to select for the output signal 20 of equalizer block 16. For example, the logic 26 shown in FIG. 1 can receive the signals C(1) through C(N-1) as the bit code and translate this code into appropriate selection signals provided to one or more of the equalizers 24 and through path 22 (or other component such as a multiplexer) to enable the appropriate path.

Figures 6, 7:
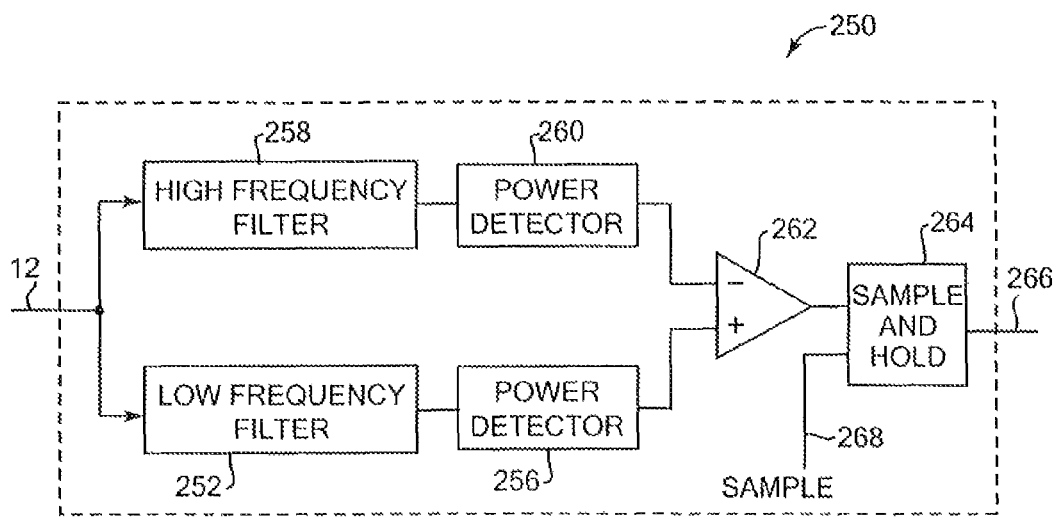
FIG. 6 is a table illustrating an example of a control code provided by output signals of the equalizer selector.
FIG. 7 is a block diagram of an example embodiment of a detector used in the equalizer selector.

One example of a control code provided by the output signals 190 of the equalizer selector 180 of FIG. 5 is shown with respect to FIG. 6. FIG. 6 shows a table 200 indicating C signals in the columns of the table, and E signals in the rows, where each E signal is one of the possible codes created from the multiple C signals. In this example, four detectors 182 are used in the equalizer detector 180 and thus four C signals are output. A C signal having a "1" value indicates that the associated detector 182 has found attenuation for its examined gain and higher-frequency range sufficient to require equalization, while a "0" value indicates no equalization is needed.

This code example provides an increasing code value to select higher-frequency equalizers for output. For example, when all four C signals are zero, the E(0) code value is "0000," which indicates a particular path in block 16 (i.e., an equalizer 24 or through path 22) associated with that code value should be selected for output. The logic 26 (or other component) translates the E(0) code into a selection signal suitable for the equalizer block 16. For example, a "0000" code can be used to select the through path 22 of the equalizer block 16. If the first C signal C(1) is 1 and the last three signals C(2), C(3), and C(4) are 0, then the E(1) code is "0001," which can be used, in one example, to select the first equalizer 24 (e.g., Equalizer(1)) that handles the lowest range of higher frequencies just above the lowest range. Similarly, the E(2) code of "0011" can be used to select the next equalizer 24 (e.g., Equalizer(2)) that handles frequencies next above the range handled by Equalizer(1), the E(3) code of "0111" can be used to select the next equalizer 24 (e.g., Equalizer(3)), and so on.

The codes formed by the outputs of the detectors 182 can be a monotonic code that increases in value in correlation with the need for higher gain for the higher-frequency content. For example, the codes in table 200 are increasing in value from E(0) to E(3) by adding a most significant 1 bit each time, where each higher code selects an equalizer that provides a higher gain. In this example, a detector 182 outputs a selection signal of 1 that provides a gain at or below the highest gain causing attenuated high frequency content, indicating the need for gain at that gain level, while a detector 182 providing a higher gain sees no attenuation and so outputs a signal of 0. In some embodiments, the codes E(0), E(1), etc. can form a thermometer code.

In some embodiments, each higher code can represent a greater length of input transmission channel, such as a cable, connected to the system and creating a greater amount of attenuation of higher-frequency content in the input signal. For example, in some embodiments, each code can represent attenuation at a different length of input channel, such as cable. In one example, a first detector can detect attenuation for cable lengths over 3 feet in length, another detector for lengths over 6 feet, another detector for lengths over 12 feet, etc. In one example, the longest channel length likely to be connected to the equalizer system 10 can be divided into a number of equal sections, and an equal number of detectors 182 can be provided. Each additional section added to the length can be associated with a higher gain provided by one of the equalizers 24.

Referring back to FIG. 5, in some embodiments, the output signals 190, or control signals C(1) through C(N-1), can be processed further before being translated into selection signal (s) by the logic 26 or other component.

In one example, the processing can include error correction, where the output signals 190 can be provided to an error correction block 194. In various embodiments, the error correction can be performed by the equalizer selector 180, the equalizer block 16, or other component. The block 194 can examine the output signals for errors and correct such errors. Such errors can originate from non-linearities or other non-idealities in the circuits processing the input signal 12. For example, in one example embodiment of FIG. 5, error correction block 194 can receive the output signals 190 which can include a code, such as one of the example codes shown in FIG. 6. The error correction block 194 can examine the code for errors which are known to be incorrect, such as a non-monotonic code. For example, in the increasing monotonic codes of FIG. 6, a misplaced "1" or "0" bit would be detected. Such a bit might be the first "1" in the code 0101, since such a code is not possible as shown in table 200 of FIG. 6. The error correction block 194 can change this code to 0001. Other errors falling outside the expected codes and/or code sequence can be similarly detected and corrected.

In some embodiments, the additional processing can include processing by a state machine 196, which can be implemented using logic gates, processor(s), and/or other processing circuitry. For example, the state machine 196 can receive the outputs of the error correction block 194, or the outputs of the Schmitt triggers 190. The state machine can choose a sampling time window, end the detection of the detector 180 after a predetermined or conditional time period (e.g., selected by design or application, or when the highest valued code is received). The state machine 196 can ensure that the output signals meet predetermined criteria. For example, in embodiments using the example code of FIG. 6, the state machine 196 can ensure that the code value from the detectors 182 is monotonic and/or increasing with time. Thus, if a code of 0001 follows a code of 0111, then the state machine can ignore the 0001 code and keep the last, highest-valued code. The state machine 196 can send the processed signal(s) as control signal(s) C to the equalizer block 16, such as to logic 26. One example of a method implemented by a state machine such as state machine 196 is described in greater detail below with respect to FIG. 11.

FIG. 7 is a block diagram of an example embodiment 250 of a detector used in the equalizer selector 18, such as detector 152 as shown in FIG. 4 or a detector 182 as shown in FIG. 5. Detector 250 can receive the input signal 12 to determine whether one of the equalizers 24 or through path 22 of the equalizer block 16 should be selected for outputting the output signal 20.

Figure 8:
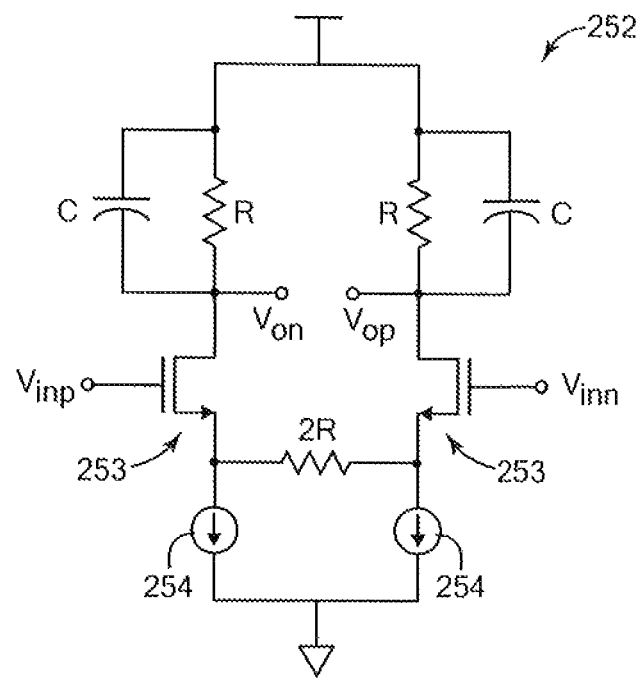
FIG. 8 is a schematic diagram of one example of a low frequency filter for use in the detector of FIG. 7.

Detector 250 includes a low frequency filter 252 that is a low-pass filter receiving the input signal 12 and filtering the higher frequency content out of the signal, allowing lower frequency content to pass through. For example, in one example embodiment, the low frequency filter 252 can have a cutoff frequency of about 600 MHz, as when using the lowest likely length of channel for the input signal. One example of a low frequency filter 252 is shown with respect to FIG. 8, showing an emitter-degenerated differential transistor pair, in which Vinp and Vinn are positive and negative differential inputs and Von and Vop are differential outputs. Resistors R and capacitors C provide a low-pass RC filter and their values determine the cutoff frequency for the filter. The differential pair of transistors 253 can act as current sources, and the current sources 254 can be provided based on how much peak-to-peak swing is desired.

Referring back to FIG. 7, the low frequency filter provides the filtered signal to a power detector 256. The power detector 256 processes the signal to provide an averaged power output. In one example, the power detector provides the RMS power level for a received AC (e.g., DC balanced) signal, e.g., using an RMS to DC converter. For example, the power detector can be an analog multiplier that squares the signal (multiplies the signal by itself). One example of a multiplier suitable for use is a BiCMOS or CMOS analog multiplier and/or Gilbert multiplier; other types of multipliers can also be used. The power detector 256 outputs a signal to a comparator 262, described below. In other embodiments, other implementations can be used. For example, peak detector(s) can be used instead of power detector 256.

A high frequency filter 258 is a high pass or bandpass filter that receives the input signal 12 and filters lower frequency content out of the signal, allowing higher-frequency content to pass through and adding an amount of gain to the higher-frequency content. For example, in one example embodiment, the high frequency filter 258 can have a cutoff frequency of about 1 GHz or higher and a gain of 3.5 dB.

Each detector 250 in the equalizer selector 18, for example, can have a different gain and cutoff frequency in the high frequency filter 258 of that detector 182. As explained above, in some embodiments each successive detector 250 can include a higher gain and higher frequency range for the high frequency filter 258.

In some alternative embodiments, one or more filters used in the equalizers 24 can be shared or used for some components of the detector 250, including the high frequency filters 258 in the detectors 250. This can reduce the amount of components in the system. Furthermore, in some embodiments, a single low-frequency filter 252 can be used or shared by multiple or all of the detectors 250 in the equalizer selector 18. In some embodiments, a low-frequency filter 252 having a different cutoff frequency can be used in each detector 250. For example, the low frequency cutoff frequency can be lower than the high frequency filter cutoff frequency by the same or similar amount in each detector 250.

Figure 9:
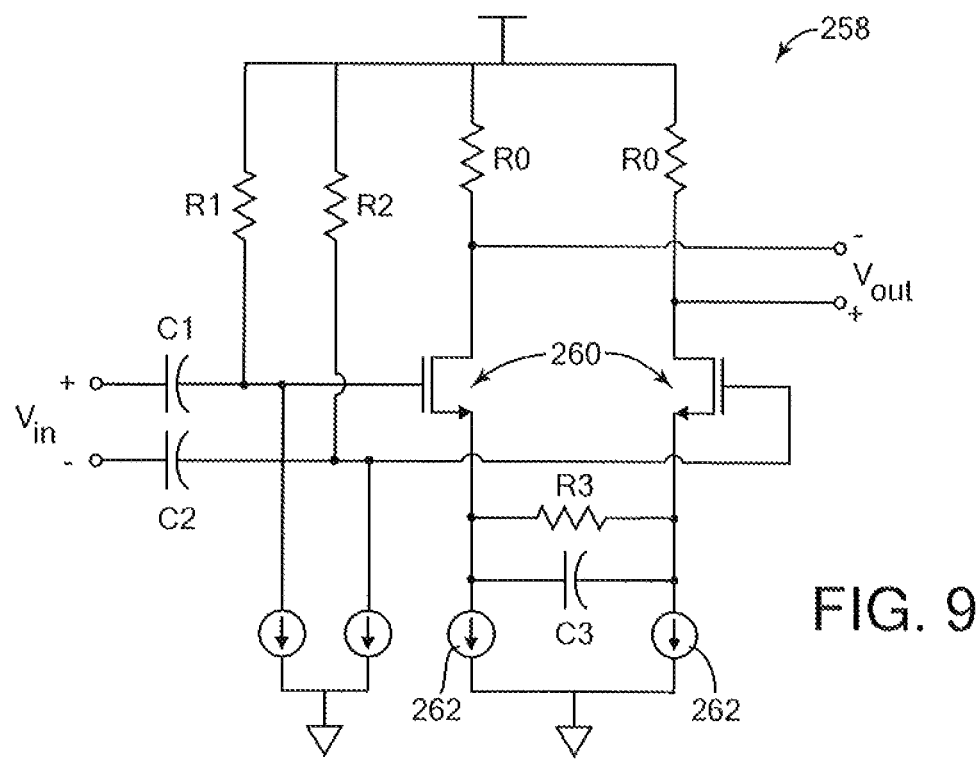
FIG. 9 is a schematic diagram of one example of a high frequency filter for use in the detector of FIG. 7.

One example of a high frequency filter 258 is shown with respect to FIG. 9, in which Vinp and Vinn are positive and negative differential inputs and Von and Vop are differential outputs, for example. Resistors R1 and R2 bias the input, and capacitors C1 and C2 provide high-pass functionality that filters out lower-frequency content in the input signal. The differential pair of transistors 260 can act as current sources, and the current sources 262 can be provided based on how much peak-to-peak swing is desired. Resistor R3 and capacitor C3 can be selected to determine how much the frequency response curve flattens at the peak gain of the frequency response for the filter.

Referring back to FIG. 7, the outputs of the power detector 260 and the power detector 256 are input to a comparator 262. The comparator 262 compares these outputs and determines which of the signals has a larger amplitude. For example, the comparator 262 outputs a negative output when the high frequency power detector 260 output is larger than the low frequency power detector 256 output, and the comparator 262 outputs a positive output when the high frequency power output is below the low frequency power output.

This comparison allows the detector 250 to determine whether attenuation exists in the higher-frequency content. For example, the output of comparator 262 is negative if there is little to no attenuation in the higher-frequency content of the input signal, since the signals from the power detectors 256 and 260 would be about equal (indicated as a higher amplitude for the higher-frequency content due to gain in the high frequency filter 258). However, the comparator 262 output becomes positive if the higher-frequency content drops below the level of the lower-frequency content. If the gain in the high frequency filter is higher (e.g., for the $3^{rd}$, $4^{th}$, or higher detector), then a larger amount of attenuation is indicated, requiring a larger amount of equalization. Such attenuation can be caused by, for example, the user connecting a longer and/or poorer-quality cable or other transmission channel that transmits the input signal 12 to the device.

The output of the comparator 262 is provided to a sample and hold block 264 that outputs a signal 266, which in some embodiments can be a signal such as signal 158 or 188 of FIGS. 4 and 5, respectively. A sample signal 268 can be input to the sample and hold block 264 from a controller to command the block 264 to output the received comparator signal as signal 266 at a particular time. This can be used to provide an output after an initial period in which the input signal is unknown or unstable. For example, upon a power reset of the circuit or system, the detector 250 may receive an input signal that is unstable, unsettled, and/or may not include both lower-frequency and higher-frequency content. The output of the comparator 262 at these times is not as reliable for the adaptive equalization herein. Once the signal has settled and a signal having lower-frequency and higher-frequency content is received (e.g., such as a K28.5 type of signal), the output of the comparator 262 can be selected to be output by the sample and hold block 264 for use by other components such as the equalizer block 16. For example, the select signal 268 can be sent after a predetermined time period after reset, power-on, or cable connection to the circuit.

Figure 10:
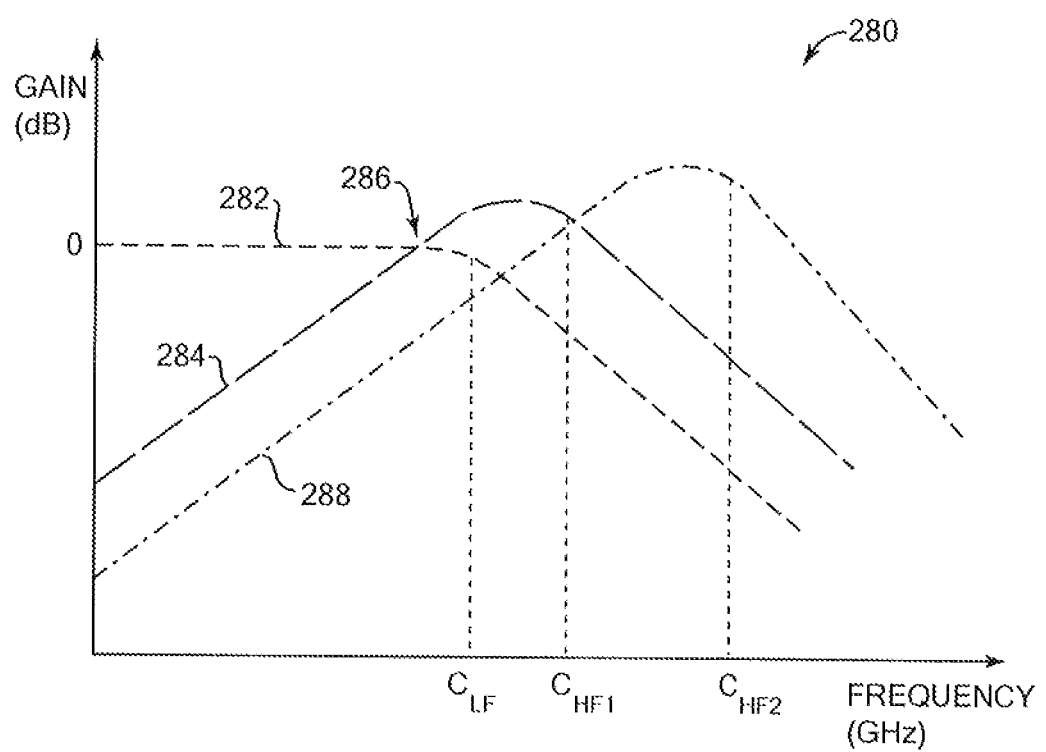
FIG. 10 is a graph illustrating examples of frequency response curves for some embodiments of a low frequency filter and high frequency filters of FIG. 7.

FIG. 10 is a graph 280 illustrating examples of frequency response curves for some embodiments of a low frequency filter 252 and high frequency filters 258 of FIG. 7. Graph 280 plots frequency vs. gain in dB for different filters. A low frequency filter response curve 282 shows the low-pass response for the low frequency filter 252, and has a cutoff frequency (e.g., output of filter is −3 dB from nominal passband value) of $C_{LF}$. The cutoff frequency can be, for example, 600 MHz in one example embodiment.

A first high-frequency filter response curve 284 shows the high-pass or bandpass response of a high frequency filter 258, having a cutoff frequency $C_{HF1}$ of about 1 GHz in this example. In this example, curve 284 starts low and rises to a peak gain that is above the gain provided by the low-frequency filter 252. In non-ideal conditions, the curve presents a bandpass response, such that at frequencies higher than the peak, the curve 284 ramps down due to conditions such as the presence of capacitance at the inputs to the power detector 260. In addition, a designer can add capacitance in parallel with the outputs of the high frequency filter 258 to create a desired response curve of a particular shape. A crossover point 286 indicates the start of a frequency range at which the high-frequency filter 258 provides a higher gain and output magnitude than the low-frequency filter 252.

A second high-frequency filter response curve 288 is also shown, indicating a high-pass or bandpass response of a different high frequency filter 258 in another detector 182 of the equalizer selector 180. Curve 288 has a cutoff frequency $C_{HF2}$ of about 2 GHz in this example. Curve 288 is similar to curve 284 but has a higher gain and is offset to create a peak response at a higher frequency than the peak of the curve 284. Each detector 182 in the equalizer detector 180 handles a different range of higher-frequency content.

Figure 11:
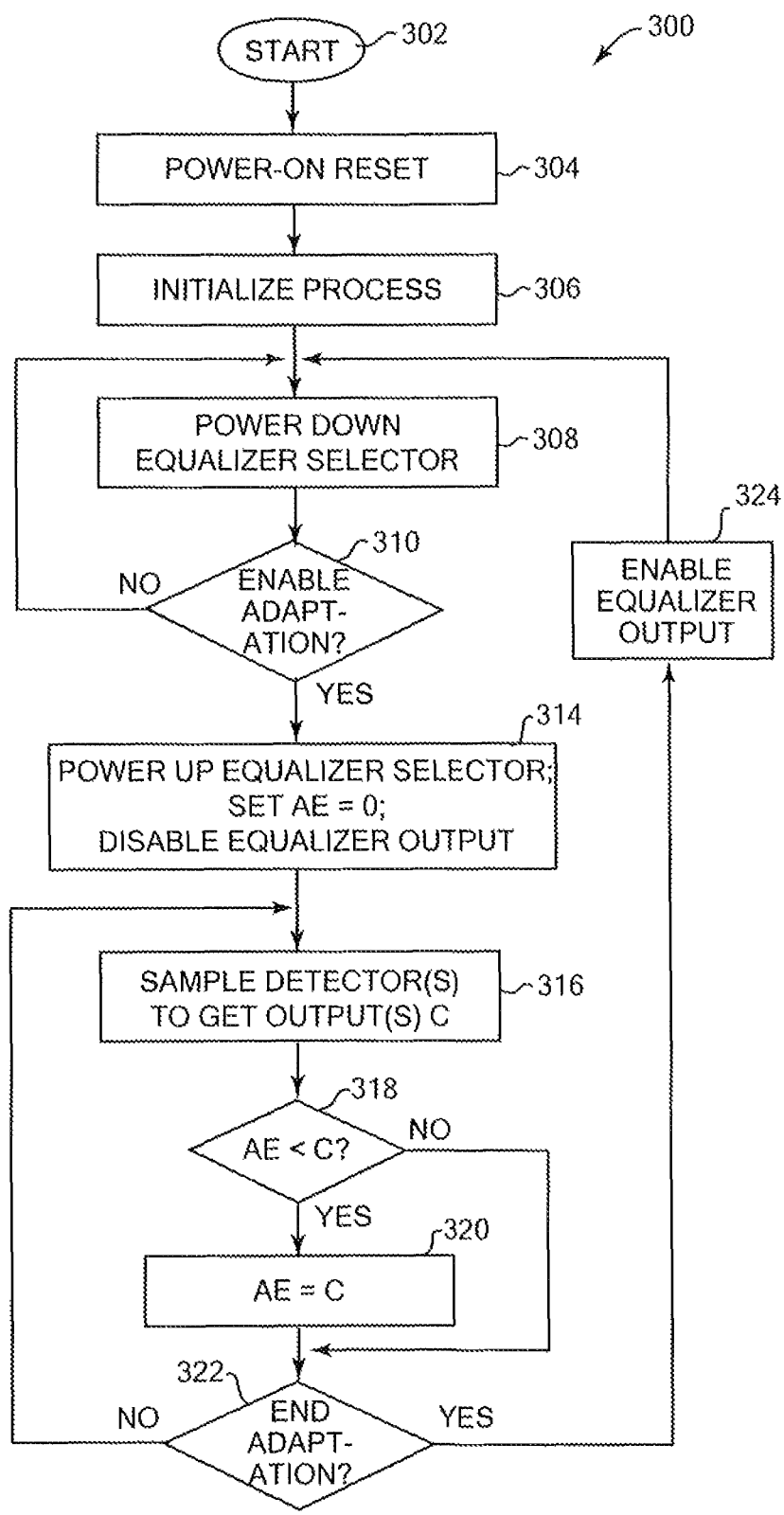
FIG. 11 is a flow diagram illustrating an example method that can implement adaptive equalization according to one or more features described herein.

FIG. 11 is a flow diagram illustrating an example method 300 that can implement adaptive equalization according to one or more features described herein. Method 300 can be implemented using software, hardware, or a combination of software and hardware elements. For example, in some embodiments, the method 300 can be implemented by a processor or processing circuitry, such as the state machine 196 that receives the C signals from the detectors or error correction block as shown in FIG. 4 or FIG. 5. Other or additional components can implement the method 300 in other embodiments. A software embodiment can include but is not limited to firmware, resident software, microcode, etc. Furthermore, some embodiments can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable storage medium include a semiconductor or solid-state memory, magnetic tape, a removable computer diskette, a random access memory (RAM), a read-only memory (ROM), a rigid magnetic disk and an optical disk.

The method begins at 302, and in step 304, a power-on reset can be performed. In some systems, a power-on reset may occur on one or more integrated circuits that include the adaptive equalizer system 10, such as upon a power-up or reset of the system or particular system components, or upon a new detection of a device or cable connected to the system 10. An initialize step 306 sets all variables (such as memory locations or registers) to an initial state for the process. In step 308, the equalizer selector (and/or other components of the equalizer system 10) are powered down such that no adaptive process is being performed. In some embodiments, one or more components of the system can continue to be powered. For example, the state machine 196 can continue powered operation to provide and receive any necessary signals.

In step 310, the process checks whether the adaptation performed by the equalizer selector 18 should be enabled. This can be determined based on one or more signals or commands from other components in the system or device in which the equalizer system 10 is included. For example, in some embodiments, the state machine 196 can receive an enable signal from a different controller or state machine in the device. This enable signal can be sent when the different controller determines that adaptation should be performed, e.g., in a standard sequence of events after power-on reset, if a new cable or device is connected, etc. If adaptation is not enabled, the process returns to step 308 to continue the power down of the equalizer selector 18. If adaptation is enabled, then the process continues to step 314.

In step 314, the equalizer selector 18 is powered up and begins processing the input signal 12. In addition, a variable AE (e.g., register or memory location) is set to zero. For example, AE can be a register in the state machine 196 which can be read by or sent to other components of the system, and can have a number of bits equal to the number of C signals output by the detectors in the equalizer selector 18. In addition, the output of the equalizer system 10 (and/or the output of another component receiving the output from system 10) is disabled upon equalizer selector power up so that no inaccurate or spurious signals are output and used before the adaptation process is complete.

In step 316, the outputs of the detector(s) of the equalizer selector 18 are sampled, i.e., the C signals from the detectors or from the error correction block as shown in FIGS. 4 and 5. In some embodiments, the process first waits a predetermined period of time to allow a spurious or unstable input signal to settle, and then samples the C signals, as explained above. In the described example method, the sampled signals can be stored in a memory location or register as a code having a number of bits, each bit representing one of the C signals.

In step 318, the process checks whether the value in AE is less than the current code value of the C outputs from the detectors. Initially, AE will be zero as set in step 314. If AE is not less than C, then the process continues to step 322, described below. If AE is less than C, this indicates that the C outputs have increased in the value of their code since the last time AE was written, and AE is set equal to C in step 320. For example, when using an increasing code as in the example of FIG. 6, the C code may increase as the detectors determine that higher frequency content in the signal requires greater boosting. By setting AE equal to C in step 320 (or otherwise incrementing AE) only when AE is less than C, the process ensures that the value of AE does not decrease, since such a result would indicate an error or erratic input signal. In other embodiments, other methods can be used to ensure that AE does not decrease in value.

After step 320, the process checks in step 322 whether to end the adaptation process. This may occur under one or more predetermined conditions. For example, in some embodiments the designer or application can determine a maximum time period in which the C outputs from the detector are sampled for adaptive equalization, after which time it is assumed that higher-frequency content in the signal will have been included in the input signal and a reliable detection performed. In one non-limiting example, a maximum time period of 1 millisecond can be used. In some embodiments, another condition for ending adaptation includes detecting the highest value possible for the code of the C signals and AE, indicating that the equalizer providing maximum gain is to be selected.

If it is determined that adaptation is to continue, then the process returns to step 316 to again sample the code from the detector outputs C. If adaptation is to end, then in step 324 the output of the equalizer block 16 is enabled. For example, this can be performed by outputting the AE signal as the selection signal C to the equalizer block 16 to cause selection of the one of the paths of the equalizer block 16 for output, or by signalling another component to read the AE variable and provide the selection signal. The equalizer block 16 provides the equalized output signal to other component(s) in the system or device. After step 324, the process returns to step 308 to power down the equalizer selector 18 while the equalizer block 16 can continue to output an equalized signal from the selected equalizer 24 or through path 22. After another appropriate signal is received, such as an enable signal from another controller received by the state machine 196, then the adaptation process can begin again at step 310.

It should be noted that the order of steps or operations described in FIG. 11 is only one example, and that different orders can be used in other embodiments, and/or some steps or operations performed simultaneously.

The embodiments described herein allow adaptive equalization to be implemented with a variety of communication standards and protocols, and allow different and longer channel lengths to be used with significantly reduced signal degradation. The equalizer system 10 can examine lower-frequency and higher-frequency content of an input signal to measure signal degradation and in effect can detect a length (and/or transmission quality) of a connected transmission channel. Features of embodiments herein allow a fast, stable, and responsive adaptive equalization not requiring feedback or a training pattern, and allow reduced and simpler components than in prior adaptive equalizers to reduce manufacturing cost and area on integrated circuits.

Although various embodiments have been described using specific terms and devices, such description is for illustrative purposes only. The words used are words of description rather than of limitation. It is to be understood that changes and variations may be made by those of ordinary skill in the art without departing from the spirit or the scope of various inventions supported by the written disclosure and the drawings. In addition, it should be understood that aspects of various other embodiments may be interchanged either in whole or in part. It is therefore intended that the claims be interpreted in accordance with the true spirit and scope of the invention without limitation or estoppel.

What is claimed is:

1. An adaptive equalizer circuit comprising:
a plurality of paths receiving an input signal;
one or more equalizers, each of the equalizers provided on one of the paths and operative to equalize signal amplitude; and
an equalizer selector receiving the input signal and operative to output a selection signal based on higher-frequency content and lower-frequency content of the input signal, wherein the selection signal is operative to select one of the paths to output an output signal that is based on the input signal;
wherein the equalizer selector includes one or more detectors operative to determine whether at least a portion of the higher-frequency content of the input signal is sufficiently attenuated to require equalization;
wherein the one or more equalizers are a plurality of equalizers and the one or more detectors are a plurality of detectors, and wherein each of the detectors compares an amplitude of the input signal in a different range of higher frequencies to an amplitude of the input signal in a range of lower frequencies;
wherein the detectors each include a high-frequency filter and a low-frequency filter receiving the input signal and providing filtered outputs; and
wherein the detectors each include a comparator receiving signals based on the filtered outputs of the high-frequency filter and the low-frequency filter and providing an output indicating which of the filter outputs has a greater magnitude.

2. The adaptive equalizer circuit as recited in claim 1 wherein one of the paths is a through path not including equalization of the input signal.

3. The adaptive equalizer circuit as recited in claim 1 wherein the one or more equalizers are a plurality of equalizers, wherein each one of the equalizers is operative to equalize the higher-frequency signal content by a different amount of gain.

4. The adaptive equalizer circuit as recited in claim 1 wherein the equalizer selector is operative to select one of the paths based on an amount of attenuation of signal amplitude detected by the equalizer selector in the higher-frequency content.

5. The adaptive equalizer circuit as recited in claim 1 wherein the one or more equalizers are a plurality of equalizers and the one or more detectors are a plurality of detectors, and wherein each of the detectors provides a detector signal, such that the detector signals collectively form a control code as the selection signal.

6. The adaptive equalizer circuit as recited in claim 1 wherein the one or more equalizers is a plurality of equalizers, and wherein each of the equalizers is associated with a different length of communication channel that provides the input signal.

* * * * *